United States Patent [19]
Zimmerman

[11] 3,844,435
[45] Oct. 29, 1974

[54] HIGH REACH ATTACHMENT FOR LOADER

[76] Inventor: Emil F. Zimmerman, Richardton, N. Dak. 58652

[22] Filed: May 18, 1973

[21] Appl. No.: 361,517

[52] U.S. Cl. ............................. 214/776, 214/773
[51] Int. Cl. .............................................. E02f 3/00
[58] Field of Search ........... 214/776, 775, 773, 769, 214/140, DIG. 10, 78, 80

[56] References Cited
UNITED STATES PATENTS

| | | | |
|---|---|---|---|
| 2,449,212 | 9/1948 | Fraga | 214/140 |
| 3,122,246 | 2/1964 | Freedy | 214/776 |
| 3,720,338 | 3/1973 | Stout | 214/776 |

*Primary Examiner*—Robert J. Spar
*Assistant Examiner*—John Mannix
*Attorney, Agent, or Firm*—H. Dale Palmatier; James R. Haller

[57] ABSTRACT

Apparatus is described for attachment to a hydraulic loader mechanism on a tractor for increasing the elevation and reach of the loader mechanism; the inventive apparatus comprising a hydraulically actuated scissors linkage and tool control levers for attachment to the existing loader mechanism.

6 Claims, 3 Drawing Figures

PATENTED OCT 29 1974  3,844,435

HIGH REACH ATTACHMENT FOR LOADER

This invention relates to tractor lifting apparatus, specifically to a lever assembly attachable to an existing tractor loader for extending the reach and elevation of lift capable of being accomplished by the loader. The invention therefore improves and enhances the normal lifting range and flexibility of a tractor lifting mechanism.

The invention is particularly adaptable for use with the lifting mechanism described in my copending application, Ser. No. 361518; filed May 18, 1973 or in a tractor lifting mechanism as therein described which is pivoted about a point near the rear of the tractor frame. However, the invention is suitable for use with other types of tractor loaders having a lifting boom controllable by an operator. The invention is conveniently attachable to such a device and results in an improved tractor loader that is operable over a higher range of elevation than previously possible; it is necessary only that the existing tractor lifting mechanism have a lifting arm and a pivot mounting point for attaching the hydraulic control devices associated with this invention.

The invention is attached to the tractor lifting mechanism and frame on each side of the tractor chassis. One connection point is the existing tractor lift mechanism, preferably at the forward extremity of said lift mechanism. A second connection point is rearward of the forward extremity of the mechanism, preferably on some portion of the lifting mechanism which proportionately follows the lifting path of the forward extremity. The third connection point is to some stable fixed tractor member, for this connection is used as the anchor and pivot point for the hydraulic jack adapted to this invention.

The novel features of the invention include a pivotable scissors member connected to the existing lifting extremity of the tractor lift mechanism, a hydraulically-actuated rod connected to the scissors member for controlling its angle of opening, and the lever linkage for connecting to a lifting tool. The scissors member is shaped at its forward end for accepting a bucket or other tool for lifting. The angle of tilt of said bucket or other tool is controllable by means of a lever and linkage, or second hydraulic jack assembly, which is attachable to the scissors member. The inventive apparatus is hydraulically actuated in cooperation with the existing tractor lift mechanism to extend the elevation of lift as well as the forward reach of the bucket or other tool attached to the invention.

Other features and advantages of the invention will become apparent from the following description and claims, and the accompanying drawings, in which:

Figure 1:
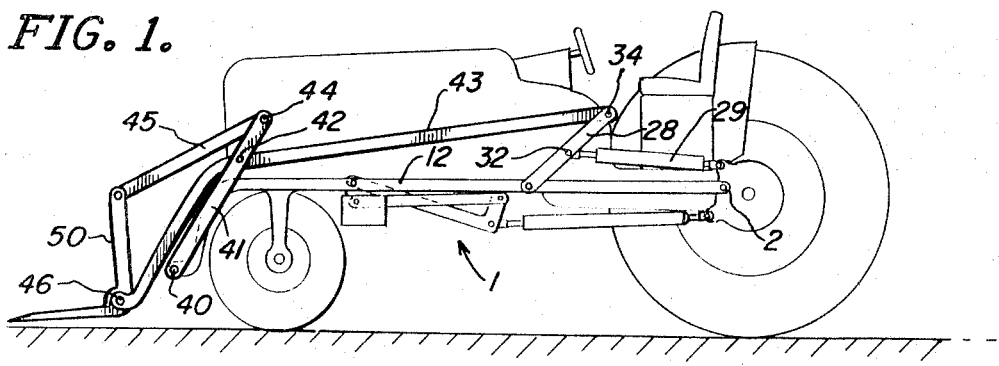
FIG. 1 is a side elevational view of the invention connected to a tractor lift mechanism.

Referring first to FIG. 1, the invention is shown attached to a hydraulic lifting mechanism, which in turn is attached to tractor 1. The details of operation of the tractor lifting mechanism are described in my copending application Ser. No. 361,518, filed May 18, 1973, and will be summarized herein only to the extent necessary for the understanding of the present invention. The hydraulic lifting mechanism consists primarily of a boom 12 pivotally attached at point 2 to a bracket which is rigidly fastened to the axle of the tractor. Boom 12 has a pivot point 40 near its forward extremity for attaching to a lifting tool or bucket. In the present invention forward lever arm 41 is pivotally connected at pivot point 40. Lever arm 41 has a pivot pin 42 located at approximately its midpoint, or nearby, which forms a pivot connection with lifting bar 43. The other end of lever arm 41 has a pivot pin 44 for attaching to a rigid bar 45 or to a hydraulic jack, which will be hereinafter described. The length of lever arm 41 is chosen to accomplish the desired elevation and reach objectives of a particular embodiment.

Lifting bar 43 has an L-bend about pivot pin 42; in the preferred embodiment lifting bar 43 is shaped similarly to boom 12, to enable lifting bar 43 to rest conveniently adjacent boom 12 in a lowered position. The forward end of lifting bar 43 has a pivot connection 46 for attaching to a bucket, shovel, or other lifting tool. The rearward end of lifting bar 43 is connected to rear lever arm 28 at pivot pin 34. Lever arm 28 is controllable at pivot pin 32 by means of hydraulic jack 29; hydraulic jack 29 in its retracted position causes lever arm 28 to move to a rearward position, pulling lifting bar 43 rearward with it. Hydraulic jack 29 causes lifting bar 43 to rest adjacent boom 12 when the hydraulic jack is retracted. Also, in this position tool 50 rests on the surface of the ground in front of the tractor.

Figure 2:
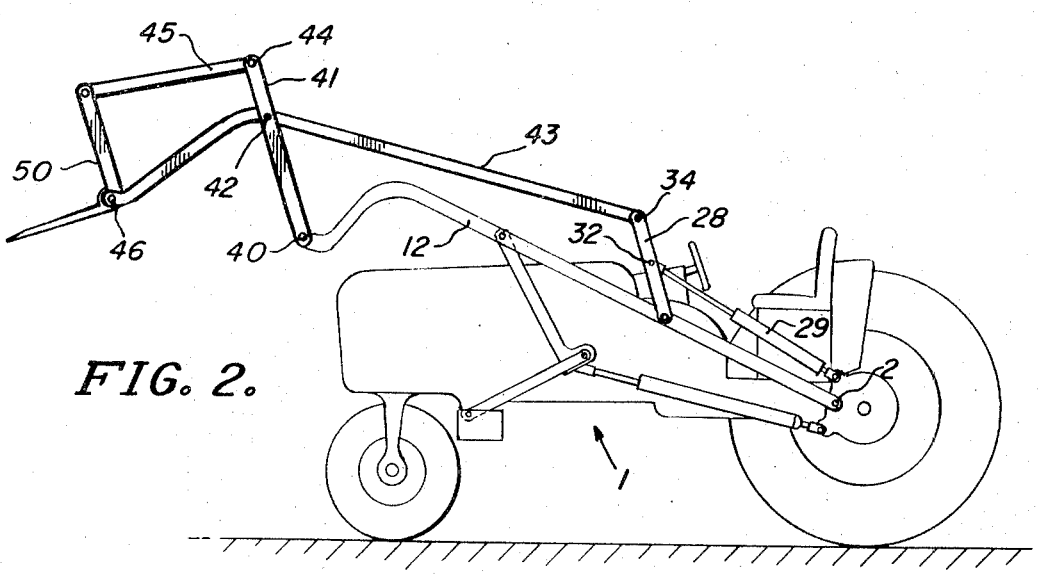
FIG. 2 is a side elevational view showing the invention in a raised position.

Referring next to FIG. 2, the invention is shown in an extended and raised position. Lever arm 28 is in a forwardly position, as controlled by the extension of hydraulic jack 29. When lever arm 28 is moved toward a forwardly position it causes lifting bar 43 to also move forward, pivoting about pivot pin 42 on lever arm 41. Lever arm 41 in turn pivots about pivot pin 40 on boom 12, causing lifting bar 43 to raise away from boom 12. This raises tool 50 to pivot about pivot connection 46 as the lever arm 28 is moved. Bar 45 may be replaced by a hydraulic jack 47 to increase the flexibility of movement of tool 50 with respect to the rest of the inventive apparatus. When this is done, tool 50 is pivotable about pivot connection 46 independently of the relative movement of lever arm 28.

FIG. 2 illustrates the operation of the combination of lever arm 41 and lifting bar 43 as a scissors mechanism. The opening and closing of the scissors mechanism is determined by the hydraulic control over lever arm 28.

Figure 3:
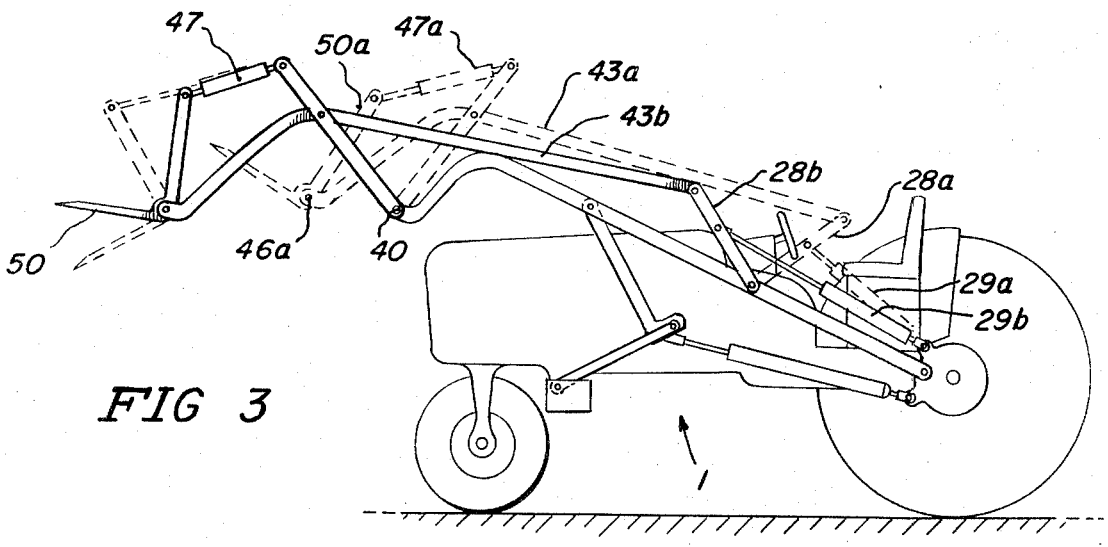
FIG. 3 is a side elevational view showing the invention in a raised position and showing several tool angles.

FIG. 3 illustrates the invention in several raised positions; hydraulic jack 47 is connected in place of rigid bar 45, for increased flexibility of control over tool 50. The dotted-line representation shows the invention in a first position, and the solid line representation shows the invention in a second position. In its first position, lifting bar 43a is retracted rearwardly by means of hydraulic jack 29a being closed. Hydraulic jack 47a is also closed or retracted, causing tool 50a to be tilted rearwardly. It should be noted that, when lifting arm 43a is in its rearward position, hydraulic jack 47a may be extended independently of any other mechanism to cause tool 50a to pivot about pin 46a.

When hydraulic jack 29 is extended to a position illustrated as illustrated as 29b, it moves lever arm 28 forwardly to position 28b. This causes lifting bar 43 to move forwardly in an arcing motion about pivot point 40 to position 43b. Tool 50a remains tilted rearwardly for so long as hydraulic jack 47a remains retracted. FIG. 3 illustrates tool 50 in position as 50b when hydraulic jack 47 is extended.

The relative motion illustrated in FIG. 3 is of particular convenience with respect to loading material or objects onto a raised platform or truck. It is apparent that the cooperating mechanisms enable an object to be picked up from the ground immediately in front of the tractor, and raised upwardly by means of boom 12 to an elevated position. Once the object has been raised to a sufficient elevation, hydraulic jack 29 can be activated to cause the lifting mechanism to lift the object forwardly and upwardly in an arcing fashion to place it over an elevated platform or truck box. Thus, the inventive apparatus enables the convenient lifting and reaching over an elevated platform for the purpose of loading and unloading. This type of motion is of great importance in the loading and unloading of trucks from the surface of the ground.

Having described a particular preferred embodiment of my invention, it will become apparent that various changes in the relative sizes and dimensions of the apparatus can be accomplished without departing from the spirit of my invention. The relative lengths of lever arms illustrated herein may be varied, depending upon the particular loading application desired, but the use of a scissors-type high lift loading mechanism such as that described herein gives a significant advantage and enhancement to hydraulic loaders usable on tractors.

I claim:

1. A lifting apparatus for extending the elevation and reach of a tractor hydraulically actuated lifting boom and tool, comprising a hydraulically actuated rear lever arm pivotally attached to said boom;

a forwardly projecting lifting bar pivotally connected to said lever arm and having a downward bend near its forward end;

a forward lever arm pivotally connected between said lifting boom and said lifting bar near the downward bend region, said forward lever arm extending upwardly beyond its connection with the lifting bar and having a pivot pin connection at its extended end;

means for pivotally connecting the tool to said lifting bar forward end; and means for pivotally connecting said tool to said forward lever arm extended end.

2. Apparatus as claimed in claim 1, wherein said means for pivotally connecting said tool to said forward lever arm extended end includes a hydraulic jack operable to tilt the tool about the pivotal connection of the latter to the lifting bar forward end.

3. Apparatus as claimed in claim 2 wherein the forward lever arm pivotally connected between said hydraulic lifting boom and said lifting bar is connected to the forward extremity of said lifting boom.

4. Apparatus as claimed in claim 3 wherein said hydraulically actuated rear lever arm further comprises a lever having pivot pin connections at each of its ends and at a point intermediate the ends, said intermediate pivot pin connection being attached to a hydraulic jack extendible rod, one of said end pivot connections being attached to said boom, and the other of said end pivot connections being attached to said lifting bar.

5. Apparatus as claimed in claim 4 wherein said connection between the rear lever end pivot connection and the lifting bar is made at the rearmost end of said lifting bar.

6. A lifting apparatus for extending the elevation and reach of a tractor hydraulic lifting mechanism including a boom which can be raised at its forward end and is pivotally connected to the tractor frame at its rearward end, comprising:

a hydraulic jack pivotally connected to said tractor frame at a point near said boom pivotal connection, and having an extendible rod projecting forwardly along said boom;

a rear lever arm having pivot pin connections at each of its ends and at a point intermediate the ends, said intermediate pivot pin connection being attached to the extendible hydraulic jack rod and one of said end pivot connections being attached to said boom;

a forwardly projecting lifting bar having a downward bend near its forward end and having a pivotal connection at its rearward end for connection to one of said rear lever arm pivot pin end connections, said lifting bar having a pivot pin connection near the point of downward bend, and having a pivotal connection at its forward and downward extremity for attachment to a tool;

a forward lever arm having pivot pin connections at each of its ends and at a point intermediate the ends, said intermediate pivot pin connection being attached to the lifting bar pivot pin connection near the point of downward bend, and having one of said end pivot pin connections attached to the forward end of said tractor boom;

a hydraulic jack connected at one of its ends to said forward lever arm other pivot pin end connection, and having an extendible rod for connection to a tool;

whereby a tool connected between said hydraulic jack extendible rod and said lifting bar forward end will be pivotal about said forward end under control of said hydraulic jack.

* * * * *